United States Patent [19]
Forquer
[11] Patent Number: 4,549,444
[45] Date of Patent: Oct. 29, 1985

[54] LOCKING GEAR DRIVE

[75] Inventor: William F. Forquer, Venice, Fla.
[73] Assignee: Security Shutter Corp., Venice, Fla.

[21] Appl. No.: 424,376
[22] Filed: Sep. 27, 1982
[51] Int. Cl.[4] ........................ F16H 57/10; F16H 1/14; F16H 1/20
[52] U.S. Cl. ........................ 74/411.5; 74/423; 292/153
[58] Field of Search ........................ 74/411.5, 425, 417, 74/625, 423; 464/39, 38; 292/153, DIG. 37

[56] References Cited

U.S. PATENT DOCUMENTS

| | | | |
|---|---|---|---|
| 1,147,188 | 7/1915 | Rojas | 160/309 |
| 1,266,332 | 5/1918 | Scroggins | 292/188 |
| 1,557,058 | 10/1925 | Johansen | 160/133 |
| 1,858,624 | 5/1932 | Hess et al. | 74/625 |
| 2,324,571 | 7/1943 | Fitz | 74/625 |
| 2,503,192 | 4/1950 | Cerf, Jr. | 292/153 |
| 2,621,678 | 12/1952 | Snyder et al. | 74/625 |
| 3,141,320 | 7/1964 | McConnell | 292/153 |
| 4,195,867 | 4/1980 | Baillie | 292/153 |
| 4,294,302 | 10/1981 | Ricke, Sr. | 160/309 |

FOREIGN PATENT DOCUMENTS

| | | | |
|---|---|---|---|
| 1509412 | 6/1969 | Fed. Rep. of Germany | 74/411.5 |
| 1011085 | 7/1963 | United Kingdom | 160/319 |

*Primary Examiner*—Lawrence Staab
*Assistant Examiner*—Michael D. Bednarek
*Attorney, Agent, or Firm*—Hauke & Patalidis

[57] ABSTRACT

A locking gear drive for a protective roll-type shutter or awning device. The gear drive comprises, for example, a housing, a driveshaft coupled to a driving gear, a driven gear meshing with the driving gear and a driven shaft coupled to the driven gear. A socket is mounted at one end of a longitudinally displaceable driveshaft and the socket is slidably disposed within an end cap affixed to the gear drive housing. A plurality of pin-like projections, acting as locking members, are provided around the exterior periphery of the socket. A plurality of interlocking members for engaging the pin-like projections are provided in the form of bores disposed in an end wall of the end cap. A compression spring disposed around the driveshaft and between the gear drive housing and socket urges the locking members and interlocking members into engagement. Inter-engagement of the pin-like projections and bores holds the driveshaft against rotation. The driveshaft is freed for rotation by longitudinal displacement of the driveshaft against the compression spring, thereby disengaging the pin-like projections from the bores. To prevent an unauthorized person from operating the gear drive, a pivotable bar is affixed within the gear drive housing proximate an end of the driveshaft, preventing longitudinal displacement of the driveshaft when the pivotable bar is in a locked position. The pivotable bar is pivotable to an unlocked position away from the driveshaft by a rotatable shaft of a conventional key-lock assembly mounted in a side wall of the gear drive housing.

6 Claims, 8 Drawing Figures

FIG. 1
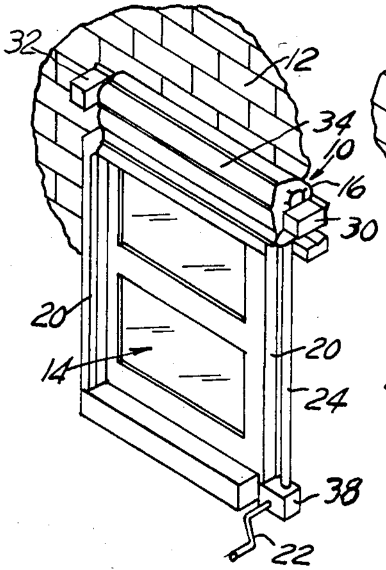
FIG. 2
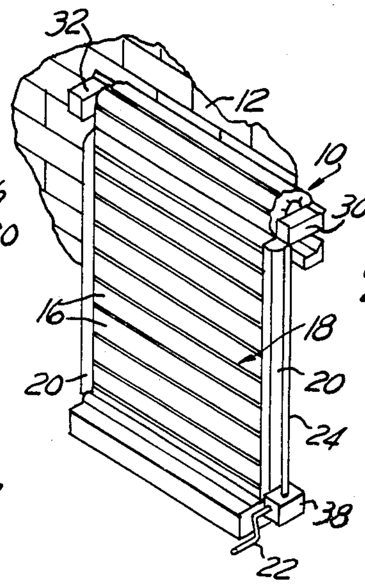
FIG. 3
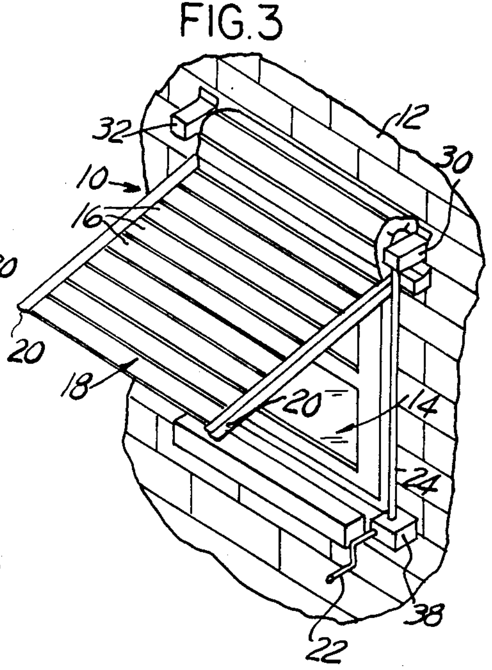
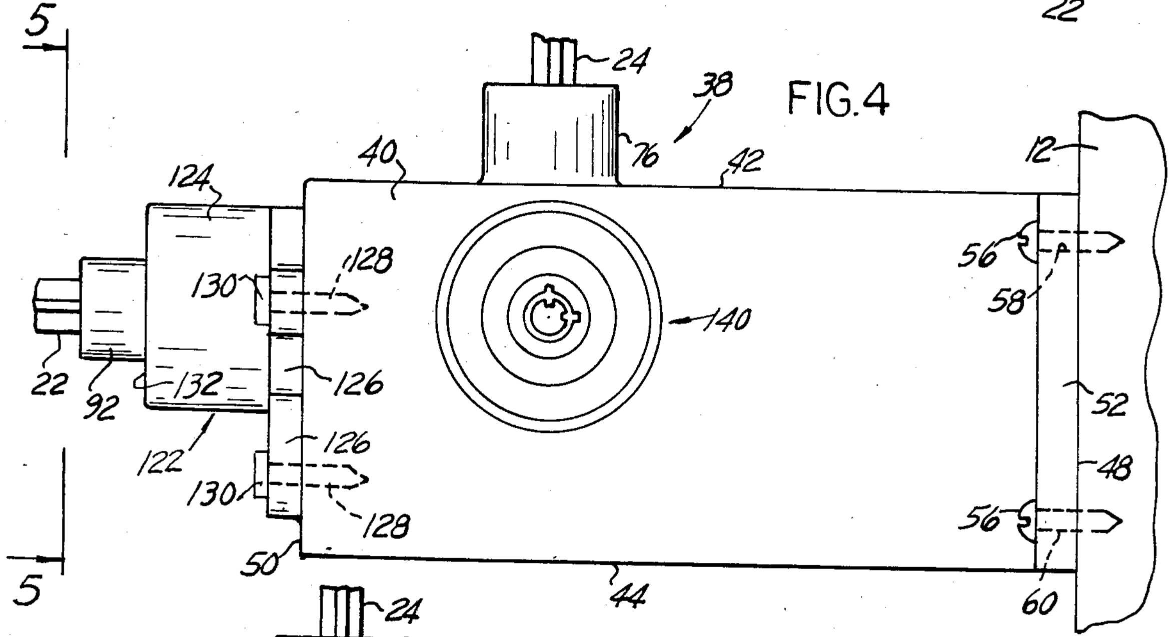
FIG. 4
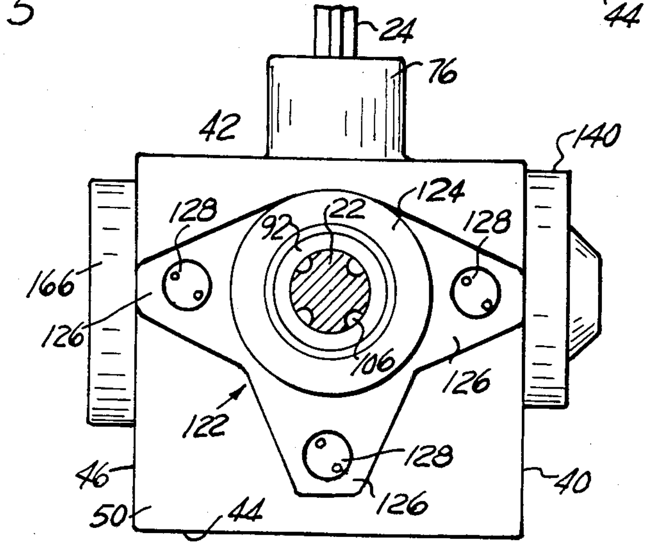
FIG. 5

LOCKING GEAR DRIVE

BACKGROUND OF THE INVENTION

The present invention relates to a locking gear drive and more particularly a locking gear drive incorporated into a protective roll-type shutter or awning device.

Security type shutters and awnings comprising a plurality of slats made of extruded aluminum, or other material, hingedly interlocked at each edge, and which can be rolled away by winding around a drum or about a rotatable shaft, are generally provided with a gear drive for the drum or rotatable shaft. Such an arrangement is disclosed, for example, in U.S. Pat. No. 4,294,302 assigned to the same assignee as the present application.

Gear drives for the rotatable shaft of a shutter or awning device generally have a driveshaft which is capable of being directly driven in rotation by a hand crank, or by a second shaft in turn hand or power driven through a second gear drive. The gear drive is enclosed in a housing, and the driven shaft and driving shaft are generally coupled by means of a pair of gears having their axes of rotation disposed in planes at right angles to each other. The gears are usually of the bevel type and provide a one-to-one gear ratio. As such a gear drive is reversible, some locking means must be provided so that the shutter can be maintained in a rolled-up position, or in any intermediate position from completely rolled-up to fully rolled-down.

Means for preventing the reverse rotation of gear drives incorporated in roll-type shutter or awning assemblies are known in the prior art. For example, in the above-mentioned U.S. Pat. No. 4,294,302, a positive locking mechanism for a gear drive incorporating bevel gears is disclosed which comprises a compression spring urging two sets of mating teeth into engagement with each other. One set of teeth is formed integrally with a portion of the interior of a gear box housing. The other set of teeth is disposed around the periphery of the driveshaft proximate one end. When both sets of mating teeth are engaged, the driving and driven shafts are held against rotation.

In such a configuration, the teeth on the driving shaft and within the gear box housing are disengaged by a driving handle or crank being pressed into a handle socket affixed at the end of the driving shaft projecting from the gear box. The driving handle longitudinally displaces the driving shaft against the pressure of the spring, thereby disengaging the mating teeth on the shaft from the teeth within the housing. Rotation of the unlocked driving shaft by the driving handle can thereafter be performed for raising or lowering the shutter.

Co-pending application Ser. No. 362,523, assigned to the same assignee as the present application, also discloses a locking mechanism for a gear drive such as the gear drive of a roll-type shutter or awning. In the gear drive of the co-pending application, one of the gear shafts, preferably the driving gear shaft, is rotatably supported such as to be longitudinally displaceable and carries at its free end a transverse pin. A stationary member disposed proximate the end of the shaft carrying the pin is provided with radial grooves. When the gear drive in is a locked position, the shaft is longitudinally displaced under the action of a coil spring such that at least one projecting end of the transverse pin is engaged in one of the radial grooves of the stationary member. The locking mechanism is unlocked by introducing the end of a crank handle into a coupling socket mounted on the other end of the shaft, and applying longitudinal pressure with the crank handle, thereby disengaging the pin from the grooves and permitting the shaft to be hand-driven in rotation by the crank handle.

As mentioned, both of the examples of locking means for a gear drive may be unlocked, for example, by the introduction of a crank handle into a socket. Longitudinal pressure applied to the handle disengages the respective interlockable components. It is preferable, in addition, that a locking gear drive be designed such that it is easily provided with a key-lock installation which prevents an unauthorized user from operating the gear drive by the mere acquisition of a suitable hand crank. Moreover, such a key-lock installation is most suitable wherein the turning of a key prevents the rotation of one shaft, or the other, of a gear drive, at the user's discretion.

SUMMARY OF THE INVENTION

The present invention remedies the inconveniences of the prior art by a novel locking gear drive of the type suitable for incorporating in a roll-type shutter or awning device.

One object of the invention is to provide a locking gear drive which will withstand an attempt by a shutter or awning user to operate the gear drive without first disengaging the locking means.

In addition, the improved locking gear drive is provided with a key-lock assembly which prevents an unauthorized user from operating the gear drive. The key-lock assembly permits the locking of either shaft of the gear drive.

These and other objects and advantages of the present invention will become apparent to those skilled in the art when the following description of the best mode contemplated for practicing the invention is read in conjunction with the accompanying drawing, wherein like numerals refer to like or equivalent parts, and in which:

BRIEF DESCRIPTION OF THE DRAWING

FIG. 1 is a schematic perspective view of a shutter assembly shown in its lowered position over a window or door;

FIG. 2 is a schematic view similar to FIG. 1 with the shutter and awning device in its pivoted or awning position;

FIG. 3 is a schematic view of the shutter and awning device in its retracted position;

FIG. 4 is a side elevation view of an example of a gear drive according to the present invention;

FIG. 5 is a front elevation view thereof;

DETAILED DESCRIPTION OF THE PREFERRED EMBODIMENTS

Figure 6:
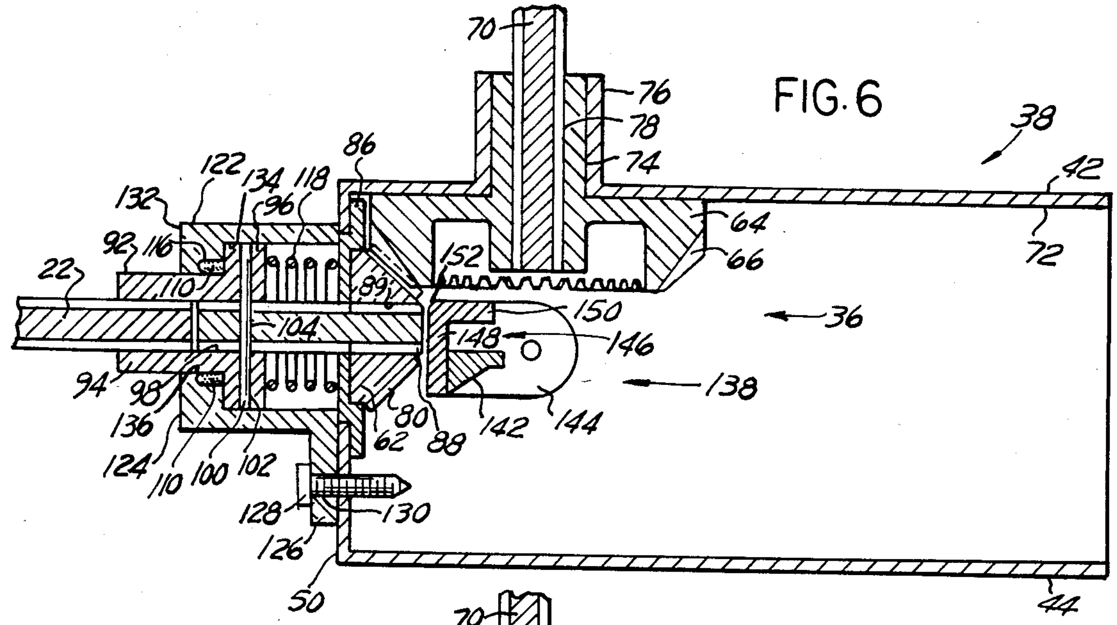
FIG. 6 is a longitudinal sectional view through a gear drive provided with a locking mechanism according to the present invention.

Referring to FIGS. 1-3, there is illustrated in a schematic manner and in perspective view a combination shutter and awning system 10 for protecting an opening in the wall 12 of a building, the opening, in the example of structure illustrated, being a window 14. The shutter and awning system 10, as described in detail in U.S. Pat. No. 4,294,302 comprises a plurality of relatively narrow slats 16 disposed horizontally with their longitudinal edges mutually pivotably interlocked such as to form a shutter curtain 18 when extended over and therefore masking the window 14, as shown in FIG. 2. The ends of the slats 16 are adapted to engage into and be slidably held by a pair of parallel vertically disposed side rails 20, each generally in the form of a U-shaped channel. The curtain 18 of slats 16 is raised and lowered by means of a hand crank 22 driving a shaft 24 through a gear box, the shaft 24 driving through a second gear box 30 fastened to the wall 12 a shaft, not shown, supported at its other end by a bracket 32. The driveshaft driven through the gear box 30 supports a drum or, alternatively, carries spoke-like members, not shown, such that when the driveshaft is rotated, the curtain 18 of slats 16 winds itself around the drum or the spoke-like members of the driveshaft in the form of a roll 34, FIG. 1, raising the curtain 18 of slats 16 and uncovering the window 14.

To form an awning, FIG. 3, the side rails 20 are made pivotable at their top end such as to be capable of being swung out to the position shown, a pair of arms, not shown, each attached at an end to the bottom of a side rail 20, holding the side rails in the illustrated pivoted position.

Locking means, as hereinafter described, disposed in the gear box permit to immobilize the curtain 18 of slat members 16 either in its raised position, FIG. 1, or in its fully lowered shutter position, FIG. 2, or awning position, FIG. 3, or in any intermediary position.

In the example of structure shown at FIGS. 4–8, a gear drive 36 is mounted in a gear drive enclosure or housing 38. As illustrated, the gear drive housing 38 is rectangular in cross-section, having four side walls, shown as 40–46 respectively, an open end 48 and an end wall 50. Flanges 52, 54 protrude at right angle from opposite edges of the open end 48 of the housing along side walls 40, 46, respectively. The flanges 52, 54 permit the housing 38 to be mounted on the wall 12, for example, by means of bolts or screws 56 passed into the wall 12 through a pair of spaced-apart longitudinal bores 58, 60 in each flange 52, 54.

The gear drive 36 mounted in the gear drive housing 38 comprises a driving gear 62 meshed with a driven gear 64, the gears 62 and 64 being bevel gears, as shown, and being disposed with their axes of rotation substantially perpendicular. As shown, the driven gear 64 is provided with gear teeth 66 protruding from the periphery of an integral, substantially flat, annular portion 68 and a stub shaft 70 rearwardly protruding from the center of one side of the annular portion 68. The flat annular portion 68 of the driven gear 64 abuts a portion of the interior surface 72 of the side wall 42. The stub shaft 70 of the driven gear 64 is journalled in an appropriate bore 74 disposed in a cylindrical boss 76 outwardly protruding from, and formed integrally with, the housing side wall 42. A splined axial bore 78 is formed through the stub shaft 70 which accepts and engages with the driven shaft 24, being splined as shown, so that when the driven gear 64 is driven in rotation, the driven shaft 24 is also driven in rotation.

The driving gear 62, as shown, is also provided with gear teeth 80 protruding from the periphery of an integral, substantially flat annular portion 82. In the illustrated structure, the outer periphery of the flat, annular portion 82 of the driving gear 62 is rotatably seated within an annular axial recess 84 provided in a bearing 86. The annular bearing 86 is press-fitted through the housing side wall 50 proximate the top of the side wall 50.

A driveshaft 88 is slidably disposed within a longitudinal bore 89 extending through the annular bearing 86 and the driving gear 62. The driveshaft 88, which is splined, as shown, drives the driving gear 62 by wedged engagement of the splines on the driveshaft 88 with spaced-apart longitudinal beads 90 disposed along the portion of the bore 89 through the driving gear 62, FIG. 8.

A sliding member 92, in the form of a driving handle socket, as shown, is fitted over one end of the driveshaft 88. In the illustrated structure, the socket 92 is comprised of a circularly cylindrical body portion 94 with an integral, increased-diameter, annular rim 96 disposed on one end. More particularly, the driveshaft 88 is fitted into an open end of an axial, longitudinal bore 98 through the sliding member 92 and is affixed therein by a spring cotter pin 100, for example, fitted through aligned transverse bores 102, 104 in the sliding member 92 and the driveshaft 88 respectively. The bore 98 is provided with a plurality of longitudinal beads 106 extending along its periphery to inter-engage the splines of the driveshaft 88, FIG. 5.

Figure 7:
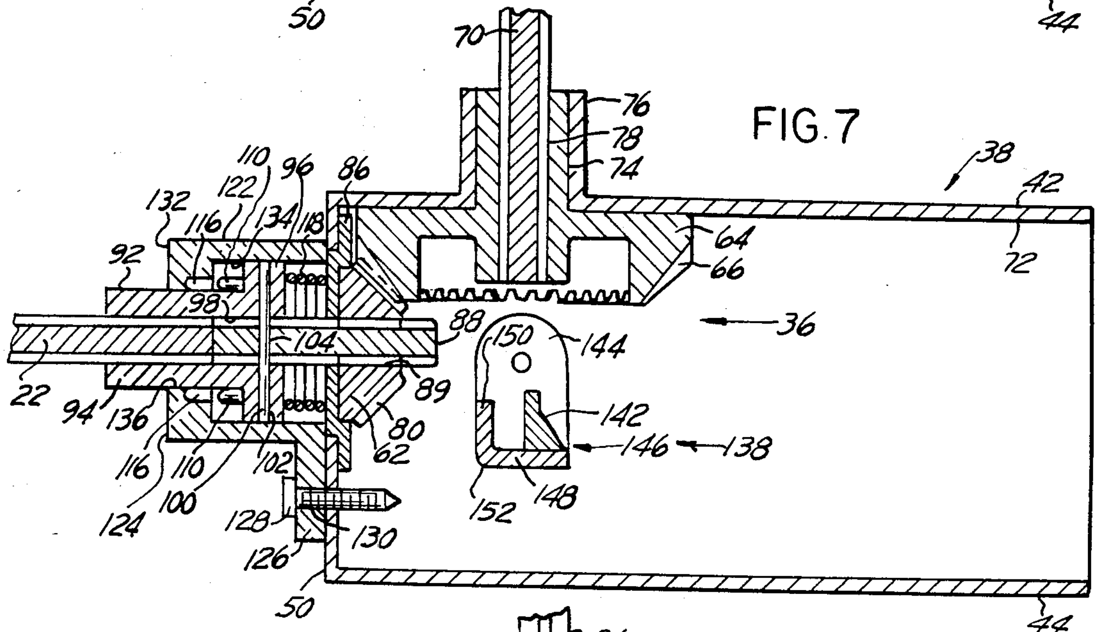
FIG. 7 is a view similar to FIG. 6 but showing the driving gear in an unlocked position.
Figure 8:
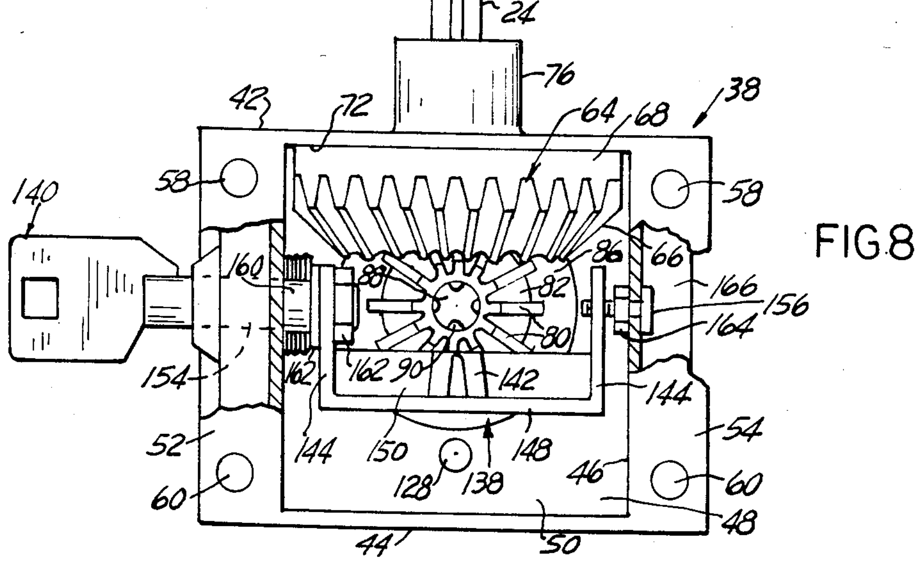
FIG. 8 is a rear elevation view of the gear drive in an unlocked position.

It is readily apparent that the driveshaft 88 is driven in rotation by inserting the driving handle 22 in the open end of the bore 98 of the sliding member 92 and rotating the handle 22 thus inserted, FIG. 7. However, prior to rotation, it is necessary for a person to apply longitudinal pressure to the driving handle 22 thus releasing inter-engaging slidable locking members and stationary inter-locking members provided as part of the gear drive mechanism, as hereafter explained.

As shown, the locking members are in the form of relatively small pin-like projections 110, four in number, spaced-around and protruding from one surface of the annular rim 96 of the sliding member 92. The respective pin-like projections 110 are urged into corresponding inter-locking members, such as shallow recesses in the form of bores 116, for example, by a biasing means, which is a compression spring 118, as shown. The compression spring 118 is preferably disposed around the driveshaft 88 and between the annular rim 96 of the sliding member 92 and the exterior surface of the wall 50 of the gear drive housing 38.

Although inter-engaging means consisting of pin-like projections 110 and bores 116 are illustrated, it is readily apparent that inter-engaging teeth or deep knurls are also suitable.

The inter-locking bores 116, sliding member 92 and compression spring 118 are disposed, in the example of structure illustrated, within a nose or end cap 122 attached to the wall 50 of the gear drive housing 38. As best seen at FIG. 5, the end cap 122 is provided with a circularly cylindrical central portion 124 and three integrally-formed mounting flanges 126 extending from the outer periphery of the central portion 124. Screws or bolts 128, for example, are affixed through transverse apertures 130 in each mounting flange 126 and aligned apertures in the end wall 50 of the gear drive housing 36 such as to secure the end cap 122 to the end wall 50.

The shallow bores 116 in the end cap 122 which interengage with the pin-like projections 110 on the rim 96 of the sliding member 92 are longitudinally disposed in an end wall 132 of the cap 122. Preferably, each bore 116 is provided with a longitudinal transverse slot 123 to provide clearance for the portion of each pin-like projection 110 which adjoins the outer periphery of the annular rim 96 of the sliding member 92.

In addition, the body portion 94 and the annular rim 96 of the sliding member 92 are slidably disposed within a pair of concentrically disposed axial, longitudinal bores 134, 136 provided in the central portion 124 of the end cap 122. One bore, designated as 134, slidably accepts the annular rim 96 of the sliding member 92, is of relatively great diameter and extends from the end wall 50 of the gear drive housing 30 to the end wall 132 of the end cap 122. The other bore 136, slidably accepts the body portion 94 of the sliding member 92, is of relatively small diameter and extends through the end wall 132 of the nose cap 122 to the open end of the other bore 136.

Longitudinal pressure applied to the sliding member 92 by a user inserting a crank 22 into the sliding member 92 and pressing thereon results in the slidable disengagement of the locking pin-like projections 110 on the rim 96 of the sliding member 92 from the shallow bores 116 in the end wall 132 of the nose cap 122, FIG. 7. Thereafter, the sliding member 92, to which the driveshaft 88 is coupled, is free to be rotated, thereby rotating the driving gear 62, driven gear 64 and driven shaft 24.

So as to prevent an unauthorized person from disengaging the interlocking pin-like projections 110 and shallow bores 116, as described above, the gear drive mechanism is preferably provided with locking means which holds the driveshaft 88 in a fixed longitudinal position and thereby retains the pin-like projections 110 within the bores 116, when the locking means is in a locked position. As shown, such locking means comprises a pivotable bar 138 affixed between two side walls 40, 46 of the gear drive housing 38 proximate the free end of the driveshaft 88, the bar 138 being actuated by a conventional key-lock mechanism 140.

At FIG. 6 the pivotable bar 138 is shown disposed in a locked position, such that it obstructs the displacement of the driveshaft 88 from the bore 89 in the driving gear 62. The pivotable bar 138 is also capable, however, of interengaging and interlocking the driven gear. For this purpose a single gear tooth 142 is provided on the pivotable bar, disposed as more fully described hereafter, which, if the key-lock assembly 140 is rotated past the position shown at FIG. 7, will interengage between two consecutive teeth 66 of the driven gear 64 thereby preventing rotation of the driven gear 64.

As best seen at FIGS. 6 and 7, the pivotable bar 138 comprises, for example, two substantially parallel elliptical side walls 144 with an integral body portion 146 disposed therebetween. Both side walls 144 are provided with a transverse bore 145 proximate the top of each. As shown, the body portion 146 is L-shaped in cross-section, defining two legs 148, 150 of substantially equal width and thickness. The aforementioned tooth 142 protrudes outwardly from the top surface of leg 148 in a plane parallel to the side walls 144.

In addition, the junction of the legs 148, 150 of the pivotable bar 138 is preferably provided with a rounded outer edge 152. This provides the desirable feature that, even if the biasing means, such as a compression spring, has become inopertive, rotation of the rounded outer edge 152 of the pivotable bar 138 in the direction of the driveshaft 88 tends to longitudinally displace the driveshaft 88 in the same direction as the biasing means thereby retaining the locking pin-like projections 110 in the shallow bores 116 and preventing rotation of the driveshaft 88 and the driving gear 62.

In the illustrated structure, the pivotable bar 138 is suspended between the side walls 40, 46 of the gear drive housing 38 by a rotatable shaft 154 affixed through the transverse bore 145 of one of the pivotable bar side walls 144 and a stationary pivot point, such as a bolt 156, as shown, affixed through the transverse bore 145 of the other pivotable bar side wall 144. It is readily apparent, however, that any other pivotable suspension means such as, for example, a continuous rod from the key-lock assembly 140 through both transverse apertures 145 of the pivotable member 138 and into housing side wall 46, would be appropriate.

The rotatable shaft 154 is actuated by the conventional key-lock assembly 140 mounted in a side wall 40 of the gear drive housing 38 at an appropriate height by appropriate means. The rotatable shaft 154 may be secured to the side wall 144 of the pivotable bar 138, for example, by a pair of nuts 160, 162 disposed one on each side of the side wall 144 with a washer 163 disposed between the nut 160 and the side wall 144. Similarly, the bolt 156 is mounted through side wall 46 of the gear drive housing 38 at an appropriate height and, if desired, a nut 164 passed over the bolt 156 such as to act as a spacer can be provided between the side wall 144 of the pivotable bar 138 and the side wall 46 of the gear drive housing.

As a security feature, the head of the bolt 156 can be protected from access and tampering by an annular rim or collar 166 projecting from the outer surface of side wall 46 of the gear drive housing 38 and formed integrally therewith, and the screws 128, securing the nose cap 122 to the housing 38, are security type screws requiring a special tool for fastening and unfastening.

The respective elements of the example of locking gear drive herein described can be made of any suitable material, such as metal or plastic. It is readily apparent that several of the elements can be manufactured, if desired, by a molding process.

Having thus described the present invention by way of typical structural embodiments thereof, modifications whereof will be apparent to those skilled in the art, what is claimed as new is as follows:

1. A locking mechanism for a gear drive for raising and lowering a curtain of hingedly interconnected slats, said gear drive having a driveshaft coupled to a driving gear, a driven gear meshing with said driving gear, a driven shaft coupled to said driven gear and a drum-like rotatable member driven by said driven shaft for winding and unwinding said curtain of slats therearound, said locking mechanism comprising a longitudinally displaceable member affixed at an end of said driveshaft, at least one locking member provided on a portion of the exterior surface of said longitudinally displaceable member, stationary interlocking members each disposed in close proximity with said locking member, biasing means longitudinally urging said longitudinally displaceable member and driveshaft in a direction interengaging said locking member and one of said interlocking members in interlocked relationship, and holding means holding said longitudinally displaceable member and driveshaft in a relatively fixed longitudinal position when said holding means is in a first position and allowing said longitudinally displaceable member and driveshaft to be longitudinally displaceable against said biasing means such as to disengage said locking member from each of said interlocking members when said holding means is in a second position, wherein a socket member is mounted on an end of said driveshaft, said socket member having means for coupling with the end of a handcrank adapted to drive said driveshaft in rotation and to longitudinally displace said driveshaft and longitudinally displaceable member against said biasing means thereby disengaging said locking member from said interlocking member, said biasing means is a compression spring disposed around said driveshaft, said compression spring being further disposed between a bearing member supporting said driveshaft and said socket member fixedly mounted at said end of said driveshaft, and said holding means comprises a pivotable bar disposed proximate the other end of said driveshaft such as to obstruct longitudinal displacement of said driveshaft and longitudinally displaceable member when said pivotable bar is in said first position, and wherein said pivotable bar is pivotably displaceable away from said other end of said driveshaft such as to permit longitudinal displacement of said driveshaft and longitudinally displaceable member when said pivotable bar is in said second position.

2. The locking mechanism of claim 1 wherein at least one of said locking members is in the form of a pin-like projection.

3. The locking mechanism of claim 1 wherein at least one of said interlocking members is in the form of a longitudinal bore.

4. The locking mechanism of claim 1 further comprising a rounded leading edge portion for said pivotable bar for engagement with the end of the driveshaft for causing longitudinally displacement of said driveshaft and longitudinally displaceable member in the direction of displacement of said biasing means for causing secure engagement of said locking members with said interlocking members.

5. The locking mechanism of claim 1 wherein said pivotable bar has a tooth-like projection from a side thereof for engagement between consecutive teeth of said driven gear by pivoting said pivotable bar to a third position.

6. The locking mechanism of claim 1 wherein said pivotable bar is mounted on the shaft of a conventional key-lock mechanism.

* * * * *

UNITED STATES PATENT AND TRADEMARK OFFICE

CERTIFICATE OF CORRECTION

PATENT NO. : 4,549,444

DATED : 10/29/85

INVENTOR(S) : William F. Forquer

It is certified that error appears in the above-identified patent and that said Letters Patent are hereby corrected as shown below:

Col. 5, line 44, after "driven gear" insert --64--.

Signed and Sealed this

*Fourteenth* Day of *January 1986*

[SEAL]

*Attest:*

DONALD J. QUIGG

*Attesting Officer* *Commissioner of Patents and Trademarks*